(12) United States Patent
Darling et al.

(10) Patent No.: US 8,795,909 B2
(45) Date of Patent: Aug. 5, 2014

(54) POROUS FLOW FIELD PLATE FOR MOISTURE DISTRIBUTION CONTROL IN A FUEL CELL

(75) Inventors: Robert Mason Darling, South Windsor, CT (US); Shampa Kandoi, Rocky Hill, CT (US)

(73) Assignee: Ballard Power Systems Inc., Burnaby (CA)

( * ) Notice: Subject to any disclaimer, the term of this patent is extended or adjusted under 35 U.S.C. 154(b) by 324 days.

(21) Appl. No.: 13/125,085

(22) PCT Filed: Oct. 22, 2008

(86) PCT No.: PCT/US2008/080669
§ 371 (c)(1),
(2), (4) Date: Apr. 20, 2011

(87) PCT Pub. No.: WO2010/047693
PCT Pub. Date: Apr. 29, 2010

(65) Prior Publication Data
US 2011/0207004 A1    Aug. 25, 2011

(51) Int. Cl.
*H01M 8/06* (2006.01)
(52) U.S. Cl.
USPC .......................................... 429/413; 429/414
(58) Field of Classification Search
USPC ................................................. 429/413–414
See application file for complete search history.

(56) References Cited

U.S. PATENT DOCUMENTS

| | | | |
|---|---|---|---|
| 5,776,625 A * | 7/1998 | Kaufman et al. | 429/434 |
| 6,835,477 B1 | 12/2004 | Brambella et al. | |
| 2005/0233201 A1* | 10/2005 | Yoshizawa et al. | 429/38 |
| 2007/0154747 A1* | 7/2007 | Darling et al. | 429/13 |
| 2007/0281193 A1 | 12/2007 | Arthur et al. | |
| 2009/0000732 A1* | 1/2009 | Jacobine et al. | 156/273.5 |

OTHER PUBLICATIONS

International Preliminary Report on Patentability and Written Opinion mailed on May 5, 2011 for PCT/US2008/080669.
Search Report and Written Opinion mailed on Mar. 5, 2009 for PCT/US2008/080669.

* cited by examiner

*Primary Examiner* — Muhammad Siddiquee
(74) *Attorney, Agent, or Firm* — Seed IP Law Group PLLC

(57) ABSTRACT

A flow field plate for use in a fuel cell includes a porous, wettable plate body including a first reactant gas channel having an inlet portion, a second reactant gas channel having an outlet portion that is adjacent the inlet portion of the first reactant gas channel, and at least one moisture reservoir fluidly connected with pores of the porous, wettable plate body. The at least one moisture reservoir can selectively collect and release moisture received from a reactant gas in the outlet portion to thereby selectively move the moisture from the outlet portion toward the adjacent inlet portion.

10 Claims, 2 Drawing Sheets

US 8,795,909 B2

POROUS FLOW FIELD PLATE FOR MOISTURE DISTRIBUTION CONTROL IN A FUEL CELL

This application is a United States National Phase application of PCT Application No. PCT/US2008/080669 filed Oct. 22, 2008.

BACKGROUND OF THE INVENTION

This disclosure relates to flow field plates in a fuel cell. Fuel cells are commonly known and used for generating electric current. For example, a fuel cell typically includes an anode catalyst, a cathode catalyst, and an electrolyte between the anode catalyst and the cathode catalyst for generating an electric current in a known electrochemical reaction between reactant gases.

Typically, the fuel cell includes flow field plates with channels for directing the reactant gases to the respective catalyst. Conventional flow field plates include straight channels in a parallel arrangement. One challenge associated with maintaining good fuel cell performance is having sufficient humidification of the reactant gases. One technique of humidifying the reactant gases includes using a porous water transport plate to circulate water within the fuel cell assembly. However, porous water transport plates are thicker than metal plates and may increase the overall size of the fuel cell. Additionally, circulating the water may require an external loop and a pump, which may add expense and complexity to the fuel cell system.

SUMMARY OF THE INVENTION

An exemplary flow field plate for use in a fuel cell includes a porous, wettable plate body including a first reactant gas channel having an inlet portion, a second reactant gas channel having an outlet portion that is adjacent the inlet portion of the first reactant gas channel, and at least one moisture reservoir fluidly connected with pores of the porous, wettable plate body. The at least one moisture reservoir can selectively collect and release moisture received from a reactant gas in the outlet portion to thereby selectively move the moisture from the outlet portion toward the adjacent inlet portion.

An exemplary method of managing moisture distribution in a fuel cell assembly including the porous, wettable plate body includes supplying a dry fluid into the inlet portion of the first reactant gas channel, directing a moist fluid, relative to the dry fluid, through the outlet portion of the second reactant gas channel, allowing moisture from the outlet portion to move through pores of the porous, wettable plate body and selectively collecting the moisture in the at least one moisture reservoir and releasing the moisture from the at least one moisture reservoir to thereby selectively move the moisture from the outlet portion toward the adjacent inlet portion.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
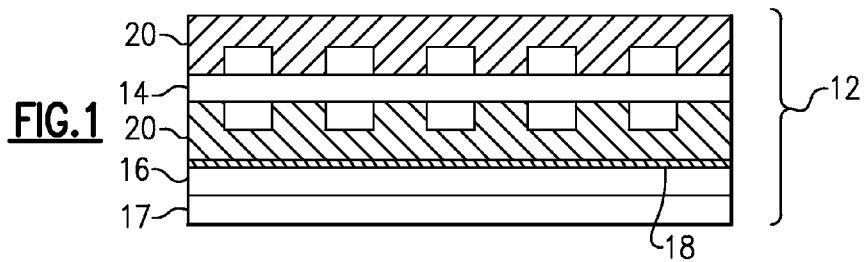
FIG. 1 illustrates an example fuel cell that includes a flow field plate and a moisture reservoir.

FIG. 1 schematically illustrates selected portions of an example fuel cell 10 for generating an electric current in a known electrochemical reaction between reactant gases, for example. It is to be understood that the disclosed arrangement of the fuel cell 10 is only an example and that the concepts disclosed herein may be applied to other fuel cell arrangements. The example fuel cell 10 includes one or more fuel cell units 12 that may be stacked in a known manner to provide the assembly of the fuel cell 10. In this example, each of the fuel cell units 12 includes an electrode assembly 14, a solid separator plate 15, a coolant plate 17, and flow field plates 20 for delivering reactant gases, such as hydrogen and air, to the electrode assembly 14. For instance, one of the flow field plates 20 may deliver air to a cathode side of the electrode assembly 14 and another of the flow field plates 20 may deliver hydrogen to an anode side of the electrode assembly 14.

At least one of the flow field plates 20 includes at least one moisture reservoir 18 that is fluidly connected with pores of the flow field plate 20 such that moisture from a reactant gas can selectively be collected in and released form the at least one moisture reservoir 18 to thereby selectively distribute the moisture, as will described in more detail below.

Figure 2:
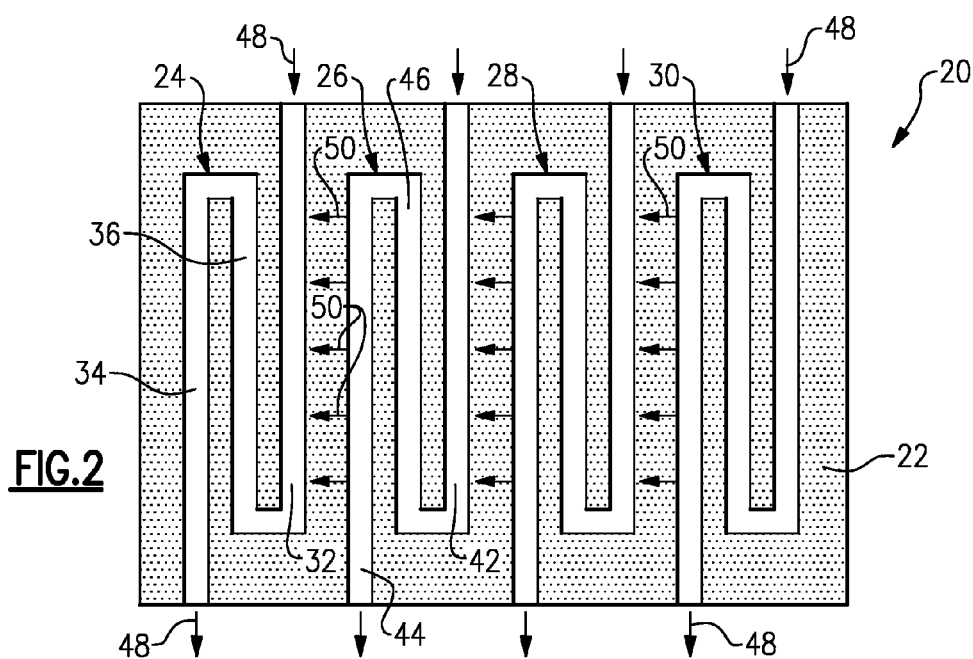
FIG. 2 illustrates a view of reactant gas channels of the flow field plate.
Figure 3:
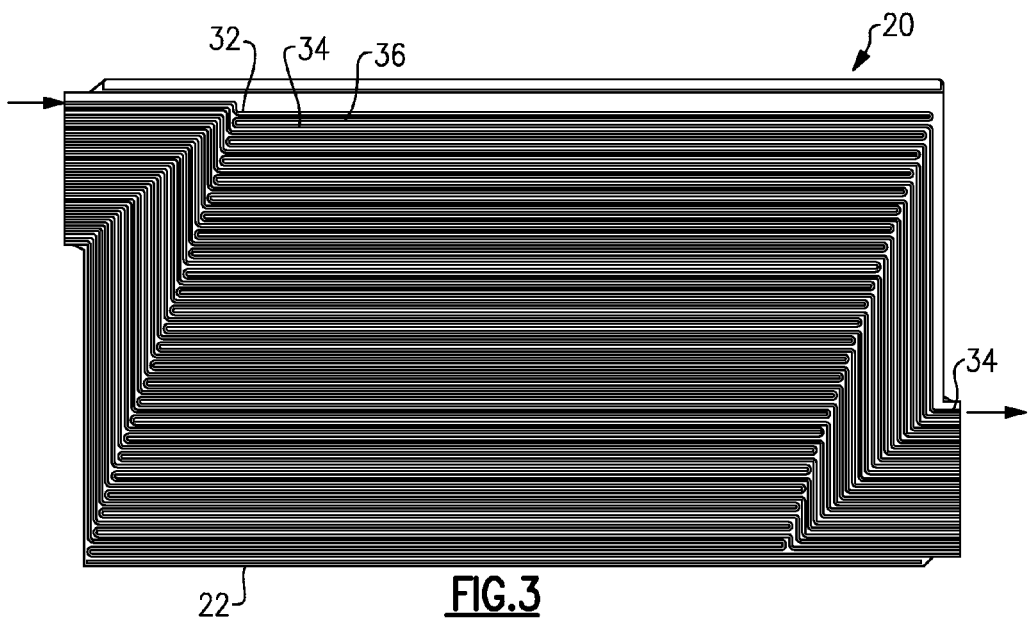
FIG. 3 illustrates another view of reactant gas channels of the flow field plate.

FIGS. 2 and 3 schematically show examples of the flow field plate 20. A plurality of flow channels are provided on a plate body 22 of the flow field plate 20. In this example, the plate body 22 is porous and wettable. A plurality of flow channels 24, 26, 28 and 30 are provided on the plate body 22. A first flow channel 24 has an inlet portion 32 and an outlet portion 34. The first flow channel 24 also includes an intermediate portion 36 between the inlet portion 32 and the outlet portion 34. Similarly, a second flow channel 26 has an inlet portion 42, an outlet portion 44 and an intermediate portion 46.

As can be appreciated from FIG. 2, flowing reactant gas (as schematically shown by the arrows 48) follows a serpentine path across the plate body 22. The reactant gas flowing within the inlet portions of the flow paths is at a higher pressure than reactant gas flowing through the outlet portions. Reactant gas introduced to the inlet portions is dryer than the reactant gas flowing through the outlet portions. The normal operation of a fuel cell typically results in more moisture within the reactant gas closer to the outlet of a flow channel compared to the inlet for known reasons. At least a portion of the moisture in the reactant gas in the outlet portion can be condensed and removed.

The inlet portion 32 of the first flow channel 24 is adjacent the outlet portion 44 of the second flow channel 26. This arrangement allows for moisture within the reactant gas in the outlet portion 44 of the second flow channel 26 (e.g., condensed moisture) to move through pores of the plate body 22 in a direction from the outlet portion 44 to the inlet portion 32. Moisture movement of this type is schematically shown by the arrows 50 in FIG. 2. The relatively higher capillary pressure within the inlet portions will tend to wick any condensed moisture from the adjacent outlet portion of the next flow channel toward the inlet portion through the corresponding portion of the plate body 22. Arranging the flow channels as shown in FIGS. 2 and 3 and using a porous, wettable plate body 22 allows for moisture distribution along the flow field plate 20 to provide humidification to reactant gas introduced into the inlet portions of the flow channels.

The moisture reservoir 18 that is fluidly connected with the pores of the flow field plate 20 can be used to selectively collect moisture (e.g., condensed water) through the pores from a reactant gas in the outlet portions 34 and release the moisture through the pores to adjacent inlet portions 32 to humidify the incoming reactant gas. For instance, the pores of the flow field plate 20 may be sized primarily to retain water. Thus, the pore size may inhibit water from rapidly flowing through the pores from the outlet portions toward the inlet portions. The moisture reservoir 18, which may generally be larger than the pores, allows water flow (e.g., see arrows 152, FIG. 4) along the flow field plate 20 to facilitate hydration of the reactant gas moving through the inlet portions 32. As will be explained below, the moisture reservoir 18 may include a variety of different structures for selectively collecting and releasing the moisture as described.

Figure 4:
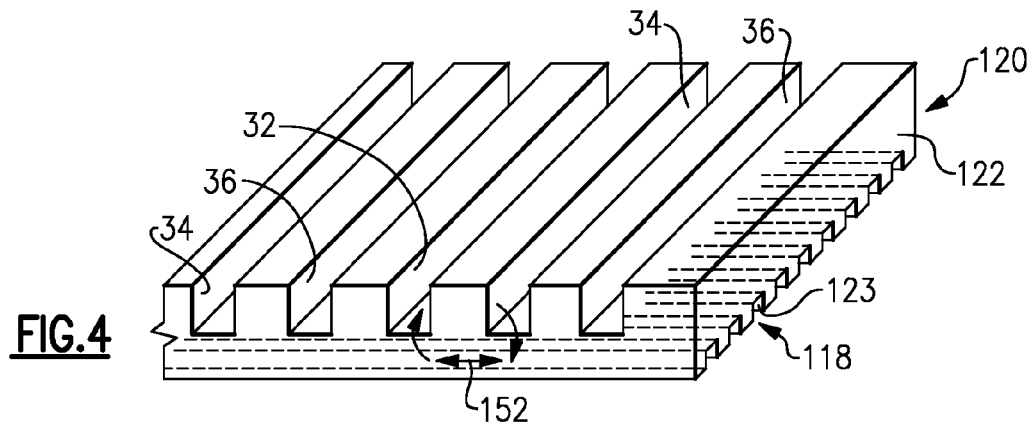
FIG. 4 illustrates another example flow field plate that includes a moisture reservoir having channels.

Referring to FIG. 4, an example flow field plate 120 is shown. In this disclosure, like reference numerals designate like elements where appropriate. Reference numerals with the addition of one-hundred or multiples thereof designate modified elements. It is to be understood that the modified elements may incorporate the same features and benefits as the original elements, except where stated otherwise. In this example, the flow field plate 120 includes a moisture reservoir 118 that is a plurality of channels 123 extending through the plate body 122 of the flow field plate 120 on an opposite side from the flow field channels. Each of the plurality of channels 123 extends straight across the body of the flow field plate 120. However, in other examples, the channels may not be straight.

The channels 123 facilitate collection and distribution of moisture between the outlet portions 34 and the adjacent inlet portions 32. For instance, the cross-sectional area of each of the channels 123 may be sized to promote capillary forces that draw the moisture through the channels 123. In one example, the cross-sectional area of each of the channels 123 may be less than about 0.15 mm (i.e., about 5.9 mils). That is, the cross-sectional area of each channel 123 is generally larger than the average diameter of the pores of the flow field plate 120, but is generally smaller than the cross-sectional area of each of the flow field channels.

Figure 5:
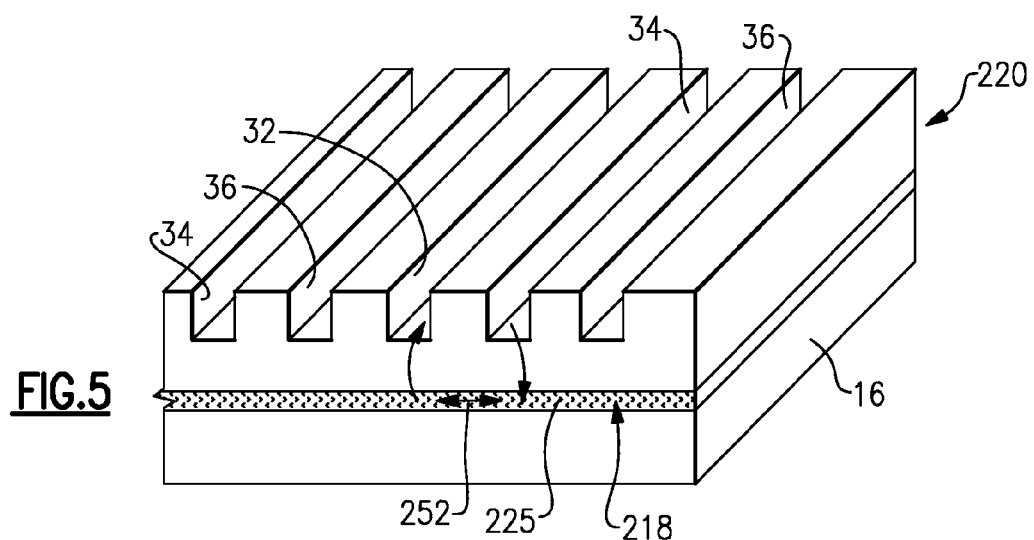
FIG. 5 illustrates another example flow field plate that includes a moisture reservoir having a porous, moisture permeable layer.

FIG. 5 illustrates another embodiment flow field plate 220 including a moisture reservoir 218 that is a porous, moisture permeable layer arranged on an opposite side from the flow field channels. In this example, the porous, moisture permeable layer 225 is sandwiched between the flow field plate 220 and the solid separator plate 16. For instance, the porous, moisture permeable layer may be a fiber layer that is treated with a hydrophilic material to facilitate collection and movement of the moisture. In one example, the hydrophilic material may be tin oxide coated onto fibers of the fiber layer. The open areas between the fibers (i.e., pores) in this example may, on average, be larger than the average diameter pore size of the flow field plate 220, to facilitate rapid moisture distribution there through (as indicated by flow arrows 252).

Figure 6:
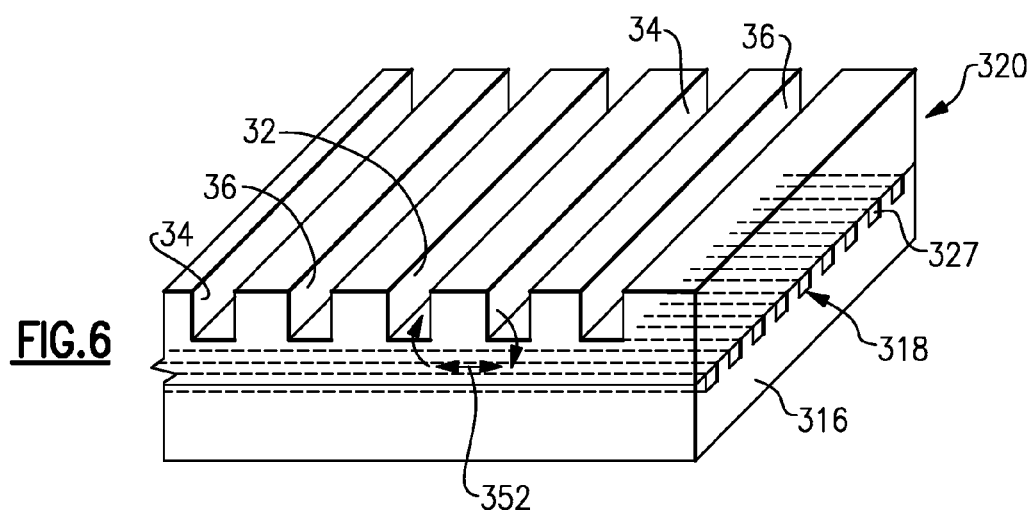
FIG. 6 illustrates another example flow field plate located adjacent to a solid separator plate having a moisture reservoir.

FIG. 6 illustrates another embodiment flow field plate 320 adjacent to a solid separator plate 316 that includes a moisture reservoir 318. The moisture reservoir 318 is on an opposite side from the flow field channels of the flow field plate 320. In this case, the moisture reservoir 318 includes channels 327 that extend through the solid separator plate 316. Similar to the channels 123 (FIG. 4), the channels 327 may be sized to promote capillary forces that draw moisture through the channels 327 to rapidly collect and distribute water (as indicated by flow arrows 352).

In operation, the exemplary moisture reservoirs 18, 118, 218, 318 may be used to manage moisture distribution in the fuel cell 10. Depending upon the operating parameters of the fuel cell 10, the moisture may be collected in the moisture reservoirs and released from the moisture reservoirs at other times to thereby selectively move the moisture from the outlet portions 34 toward the adjacent inlet portions 32.

In one example, the fuel cell 10 collects and stores the moisture within the moisture reservoir 18, 118, 218, 318 at low fuel cell electric current densities that generate a relatively low amount of heat, and the fuel cell 10 releases moisture from the moisture reservoir 18, 118, 218, 318 at relatively high fuel cell electric current densities that generate relatively high amounts of heat that evaporate the stored water. In some examples, the reactant gas pressure, coolant temperature, coolant flow rate, or combinations thereof control whether the moisture reservoir 18, 118, 218, 318 collects or releases the moisture. For instance, such parameters may be pre-selected such that the fuel cell 10 collects and stores moisture when the fuel cell 10 is below a predetermined operating temperature and releases the moisture when the fuel cell is above the predetermined temperature. That is, high pressure and low temperature should lead to water storage. High coolant flow could lead to more storage if the coolant inlet is in the vicinity of an outlet portion 34.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow field plate for use in a fuel cell comprising:
a porous, wettable bipolar plate body including a first reactant gas channel having an inlet portion, a second reactant gas channel having an outlet portion that is adjacent the inlet portion of the first reactant gas channel, and at least one moisture reservoir fluidly connected with pores of the porous, wettable bipolar plate body such that the at least one moisture reservoir can selectively collect and release moisture received from a reactant gas in the outlet portion to thereby selectively move the moisture from the outlet portion toward the adjacent inlet portion;
a porous, moisture permeable layer adjacent a side of the porous, wettable bipolar plate body that is opposite from the first reactant gas channel and the second reactant gas channel, and the at least one moisture reservoir extends through the porous, moisture permeable layer; and
a solid separator plate adjacent the porous, moisture permeable layer, and the at least one moisture reservoir includes at least one channel extending in the solid separator plate.

2. The flow field plate as recited in claim 1, wherein the at least one moisture reservoir is sized to promote capillary forces that draw the moisture therethrough.

3. The flow field plate as recited in claim 1, wherein the at least one moisture reservoir includes at least one channel extending through the porous, wettable bipolar plate body.

4. The flow field plate as recited in claim 3, wherein the at least one channel includes a first nominal cross-sectional area and the pores of the porous, wettable bipolar plate body include a second, average cross-sectional area that is smaller than the first, nominal cross-sectional area.

5. The flow field plate as recited in claim 1, wherein the porous, moisture permeable layer comprises a hydrophilic material.

6. The flow field plate as recited in claim 1, wherein each of the first reactant gas channel and the second reactant gas channel follow serpentine paths along the porous, wettable bipolar plate body.

7. The flow field plate as recited in claim 1, wherein the first reactant gas channel and the second reactant gas channel have respective cross-sectional areas, the at least one moisture reservoir includes at least one channel that has a cross-sectional area, the pores of the porous, wettable bipolar plate body have an average cross-sectional area, and the cross-sectional area of the at least one channel of the moisture reservoir is larger than the average cross-sectional area of the pores and is smaller than the respective cross-sectional areas of the first reactant gas channel and the second reactant gas channel.

8. The flow field plate as recited in claim 1, wherein the at least one moisture reservoir includes a plurality of channels that extend lengthwise in a direction that is transverse to the lengthwise directions of the first reactant gas channel and the second reactant gas channel.

9. The flow field plate as recited in claim 1, wherein the porous, wettable bipolar plate body includes a plurality of channels on an opposite side from the first reactant gas channel and the second reactant gas channel, the plurality of channels serving as the at least one moisture reservoir.

10. The flow field plate as recited in claim 9, wherein the plurality of channels each have a cross-sectional area and the first reactant gas channel and the second reactant gas channel have respective cross-sectional areas, and the cross-sectional area of the plurality of channels is smaller than the cross-sectional area of the first reactant gas channel and the second reactant gas channel.

\* \* \* \* \*